US010073486B2

(12) United States Patent
Wiesbauer et al.

(10) Patent No.: US 10,073,486 B2
(45) Date of Patent: Sep. 11, 2018

(54) SYSTEM AND METHOD FOR SUPPLY CURRENT SHAPING

(71) Applicant: Infineon Technologies AG, Neubiberg (DE)

(72) Inventors: Andreas Wiesbauer, Poertschach (AT); Christian Jenkner, Klagenfurt (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 198 days.

(21) Appl. No.: 15/250,669

(22) Filed: Aug. 29, 2016

(65) Prior Publication Data

US 2018/0059708 A1 Mar. 1, 2018

(51) Int. Cl.
*G05F 5/00* (2006.01)
*H04R 19/04* (2006.01)
*H02J 1/00* (2006.01)

(52) U.S. Cl.
CPC ................ *G05F 5/00* (2013.01); *H04R 19/04* (2013.01)

(58) Field of Classification Search
CPC ................................. H04R 19/04; G05F 5/00
USPC ........................................................... 307/31
See application file for complete search history.

(56) References Cited

U.S. PATENT DOCUMENTS

2013/0194841 A1* 8/2013 Harada ................ H02H 7/1255 363/52

FOREIGN PATENT DOCUMENTS

WO WO0038304 A1 * 6/2000 ........ H02M 3/33507

* cited by examiner

*Primary Examiner* — Hal Kaplan
(74) *Attorney, Agent, or Firm* — Slater Matsil, LLP

(57) ABSTRACT

According to an embodiment, a device includes a power supply terminal configured to provide a power supply signal to a plurality of functional components and a power supply shaping circuit coupled to the power supply terminal. The power supply shaping circuit is configured to determine a variation signal of the power supply signal and shape changes in the power supply signal by controlling a dummy load coupled to the power supply terminal based on the variation signal.

34 Claims, 6 Drawing Sheets

SYSTEM AND METHOD FOR SUPPLY CURRENT SHAPING

TECHNICAL FIELD

The present invention relates generally to electronic systems, and, in particular embodiments, to a system and method for supply current shaping.

BACKGROUND

Transducers convert signals from one domain to another and are often used in sensors. One common sensor with a transducer that is seen in everyday life is a microphone that converts sound waves to electrical signals. Another example of a common sensor is a thermometer. Various transducers exist that serve as thermometers by transducing temperature signals into electrical signals.

Microelectromechanical systems (MEMS) based sensors include a family of transducers produced using micromachining techniques. MEMS, such as a MEMS microphone, gather information from the environment by measuring the change of physical state in the transducer and transferring a transduced signal to processing electronics that are connected to the MEMS sensor. MEMS devices may be manufactured using micromachining fabrication techniques similar to those used for integrated circuits.

MEMS devices may be designed to function as, for example, oscillators, resonators, accelerometers, gyroscopes, temperature sensors, pressure sensors, microphones, and micro-mirrors. Many MEMS devices use capacitive sensing techniques for transducing the physical phenomenon into electrical signals. In such applications, the capacitance change in the sensor is converted to a voltage signal using interface circuits.

One such capacitive sensing device is a MEMS microphone. A MEMS microphone generally has a deflectable membrane separated by a small distance from a rigid backplate. In response to a sound pressure wave incident on the membrane, it deflects towards or away from the backplate, thereby changing the separation distance between the membrane and backplate. Generally, the membrane and backplate are made out of conductive materials and form "plates" of a capacitor. Thus, as the distance separating the membrane and backplate changes in response to the incident sound wave, the capacitance changes between the "plate" and an electrical signal is generated.

MEMS based sensors are often used in mobile electronics, such as tablet computers or mobile phones. In some applications, it may be desirable to increase the functionality of these MEMS based sensors in order to provide additional or improved functionality to the electronic system including the MEMS based sensors, such as a tablet computer or mobile phone, for example.

SUMMARY

According to an embodiment, a device includes a power supply terminal configured to provide a power supply signal to a plurality of functional components and a power supply shaping circuit coupled to the power supply terminal. The power supply shaping circuit is configured to determine a variation signal of the power supply signal and shape changes in the power supply signal by controlling a dummy load coupled to the power supply terminal based on the variation signal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
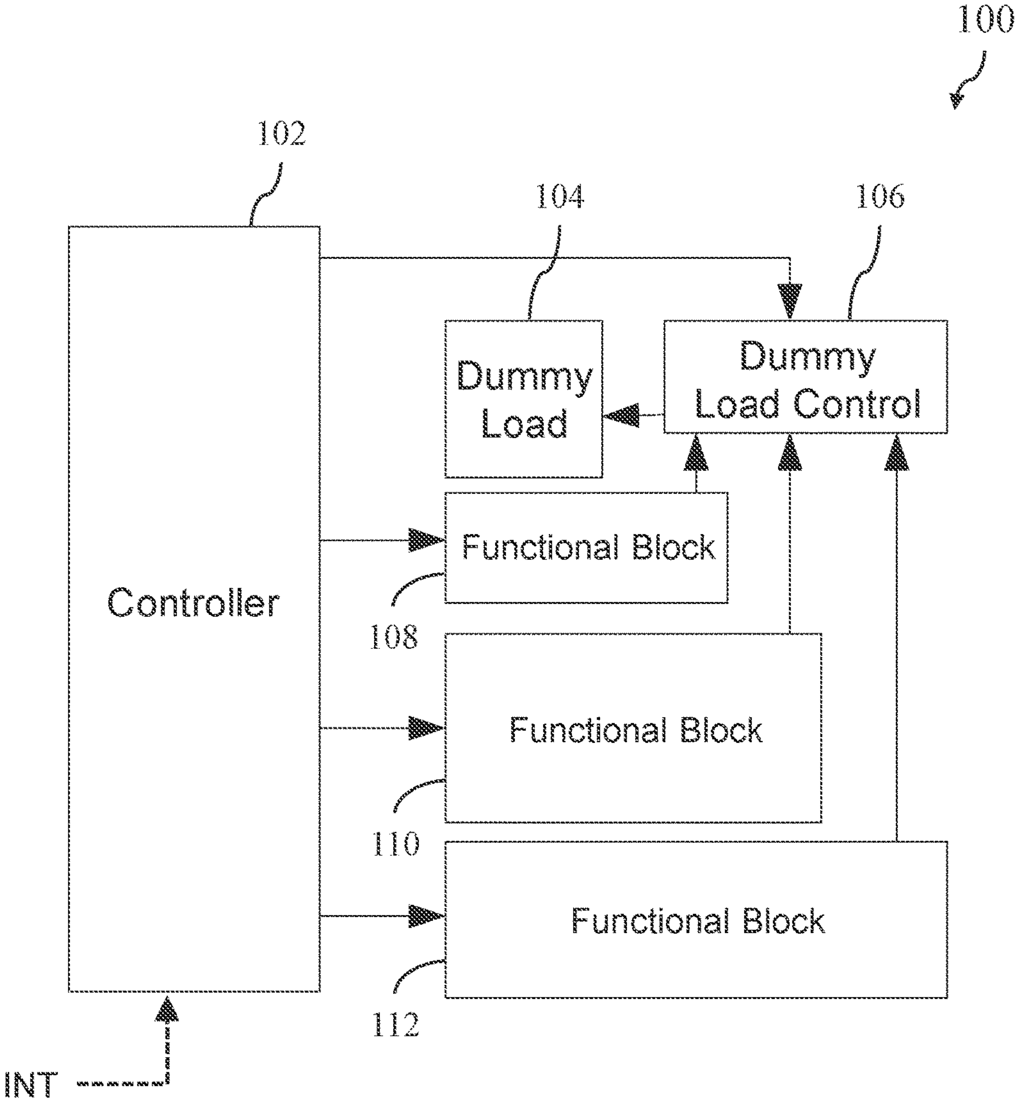
FIG. 1 illustrates a system block diagram of an embodiment device.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely devices containing multiple components, and more particularly, packaged components including sensors and functional circuit blocks. Some of the various embodiments described herein include MEMS transducer systems, packaged components, interface circuits for transducer and MEMS transducer systems, power supply signals, power supply variation, thermal crosstalk, and packaged components including MEMS transducers and associated interface circuits. In other embodiments, aspects may also be applied to other applications involving any type of transducer or packaged component according to any fashion as known in the art.

In an effort to increase the functionality and performance of various packaged devices, multiple functional components are included in the same packaged device in various embodiments. For example, various embodiment packaged devices include multiple sensors coupled to one or more integrated circuits (ICs). The sensors may include temperature sensors, microphones, pressure sensors, humidity sensors, gas sensors, accelerometers, gyroscopes, or other sensors. Similarly, the one or more ICs may include clock circuits, bandgap reference circuits, test and calibration circuits, charge pump circuits, biasing circuits, measurement circuits, analog-to-digital converters (ADCs), digital-to-analog converters (DACs), or other circuits. These various functional components, including sensors and/or integrated circuit components, may be integrated on a single IC or may be provided as separate components attached together, such as in a chip stack or on a printed circuit board (PCB), and incorporated in a single device package. Such embodiments may provide additional functionality within a single package and may lead to cost savings, increased performance, decreased power consumption, and physical space savings, for example.

When multiple such functional components are combined into a single packaged device, various performance characteristics occur. One such characteristic is thermal crosstalk. The inventors have discovered that the small, or large, variations in power supply consumption that occur as the various functional components turn on or turn off during operation lead to an increase or decrease in heat generation. The variation in heat generation inside the single packaged device may lead to thermal interference between the various functional components, described herein as thermal crosstalk. Particularly, the inventors have discovered that small, or large, temperature fluctuations caused by thermal crosstalk occur with various frequency components, that also may include harmonics at additional frequencies. In some embodiments, the various functional components, such as various sensors, may be sensitive to signals within a specific frequency band.

The inventors have discovered that, when the frequency components, or harmonics thereof, of the thermal crosstalk fall within the sensitive frequency band of a functional component (including sensors) in the packaged device, even small variations may lead to noise or degraded performance for the functional components or sensors that are sensitive to the specific frequency band. Thus, according to various embodiments, systems and circuits include a dummy current generation element in the packaged device that is configured to shape the supply current provided to the various functional components (including sensors). In such embodiments, variations of the supply current caused by the turning on and turning off of the various functional components are predetermined or detected by a control element that controls the dummy current generation element. The dummy current generation element is controlled in order to shape or smooth the changes in the supply current to reduce or remove frequency components of thermal crosstalk from frequency bands to which the various functional components (including sensors) are sensitive. Various details of embodiment systems and components are described herein.

FIG. 1 illustrates a system block diagram of an embodiment device 100 including controller 102, dummy load 104, dummy load control 106, functional block 108, functional block 110, and functional block 112. According to various embodiments, device 100 may be a packaged device that includes multiple functional components in a single package. In the illustrated embodiment, device 100 includes three functional elements: functional block 108, functional block 110, and functional block 112. In other embodiments, device 100 may include any number of functional components, such as two or more. In various embodiments, functional block 108, functional block 110, and functional block 112, as well as additional functional components, may include various components. In particular embodiments, at least one of functional block 108, functional block 110, and functional block 112 includes a sensor from the group including temperature sensors, microphones, pressure sensors, humidity sensors, gas sensors, particulate matter sensors, accelerometers, and gyroscopes. In further particular embodiments, at least one of functional block 108, functional block 110, and functional block 112 includes an IC or IC sub-block from the group including clock circuits, bandgap reference circuits, test and calibration circuits, charge pump circuits, biasing circuits, measurement circuits, analog-to-digital converters (ADCs), or digital-to-analog converters (DACs). Various embodiments may include systems as described in U.S. patent application Ser. No. 14/661,429, filed on Mar. 18, 2015, and entitled "System and Method for an Acoustic Transducer and Environmental Sensor Package," which is incorporated herein in its entirety.

According to various embodiments, controller 102 functions to turn one or more of functional block 108, functional block 110, and functional block 112 (or one of the included sub-blocks) on and off during operation. For example, functional block 108 may be a sensor that is maintained in an operating condition with a steady-state power draw while functional block 110 is a measurement circuit that is only turned on during measurement operations. In such embodiments, when functional block 110 is turned on during a measurement operation, the power drawn from a power supply rail (not shown in FIG. 1) may increase. The increased power draw leads to additional heating, which may produce thermal crosstalk having particular frequency components that affect the sensor of functional block 108. In such embodiments, dummy load control 106 receives indication of the change in power draw that occurs due to functional block 110 being turned on for a measurement operation. The indication may be a control signal from controller 102 related to the upcoming activation of functional block 110. In further embodiments, the indication received at dummy load control 106 may be based on measurement of the variation in the supply current. Based on the indication of the change in power draw, dummy load control 106 provides control signals to dummy load 104 in order to shape the changes in power draw.

In various embodiments, controller 102 may provide control signals for different modes of operation, which leads to different levels of power consumption. In some embodiments, the different modes may include a low power mode, a high performance mode, and specific sensing modes limiting the number of active sensors. In such embodiments, the different modes of operation may be selected based on control information received at interface INT, which may be coupled to a system controller. Interface INT may be a standard interface such as a serial peripheral interface (SPI), an inter-integrated circuit (I^2C) bus, or the like, that couples device 100 to the system controller. In further embodiments, changes of activity on interface INT may also lead to different levels of power consumption. For example, some embodiments include a clock signal in interface INT. Changes in the clock rate of the clock signal may also lead to different levels of power consumption for device 100. In such embodiments, dummy load control 106 provides control signals to dummy load 104 in order to shape the changes in power draw.

According to various embodiments, dummy load 104 is controlled by dummy load control 106 to smooth or shape the transitions in power draw as one or more of functional block 108, functional block 110, and functional block 112 turn on or turn off. The smoothing or shaping of the power draw may include slowly increasing a current drawn from the power supply in dummy load 104 and decreasing the current drawn by dummy load 104 as functional block 108, functional block 110, or functional block 112 increase the current drawn.

In various embodiments, controller 102 may include a digital logic state machine implemented on an application specific IC (ASIC), a field programmable gate array (FPGA), or the like, for example. In other embodiments, controller 102 may be implemented as a microcontroller or the like. In various embodiments, the various components of device 100 (including controller 102, dummy load 104, dummy load control 106, functional block 108, functional block 110, and functional block 112) may be implemented on a single IC, such as a system-on-chip (SoC). In other embodiments, the various components of device 100 may be implemented on one or more microfabricated dies that are packaged together, for example using wafer bonding as a chip stack or by attaching each separate microfabricated die to a PCB. According to various embodiments, the components of device 100 are included in a single device package.

Figure 2A:
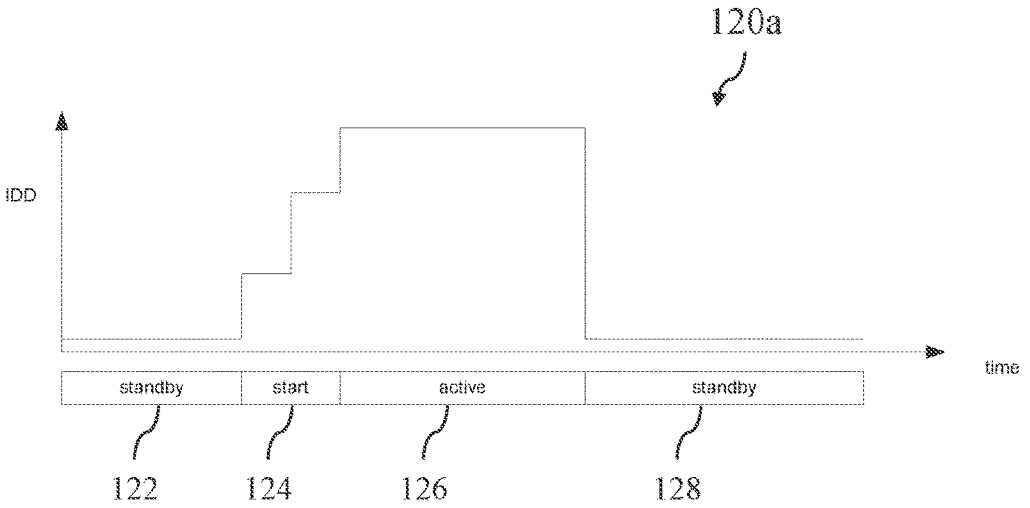
FIGS. 2A and 2B illustrate plots of supply current for illustrating embodiment features.
Figure 2B:
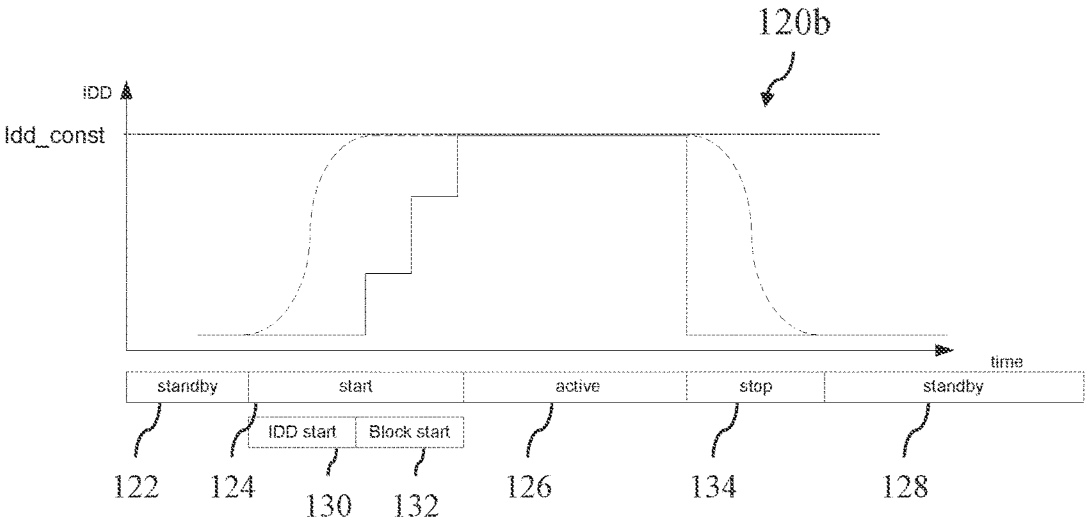

FIGS. 2A and 2B illustrate plots of supply current for illustrating embodiment features. According to various embodiments, plots 120*a* and 120*b* in FIGS. 2A and 2B illustrate supply current IDD drawn as functional block 108, functional block 110, and functional block 112 are turned on and turned off. As shown, during standby phase 122, functional block 108, functional block 110, and functional block 112 are each turned off and supply current IDD is low. Following standby phase 122, start phase 124 includes turning on each of functional block 108, functional block 110, and functional block 112. In such embodiments, each step increase of supply current IDD corresponds to turning on one of functional block 108, functional block 110, and functional block 112. Following start phase 124, each of functional block 108, functional block 110, and functional block 112 operate during active phase 126. At the end of active phase 126, each of functional block 108, functional block 110, and functional block 112 are turned off in order to enter standby phase 128.

Plot 120*a* in FIG. 2A illustrates supply current IDD during a turn on and turn off sequence without supply current shaping or smoothing. According to various embodiments, plot 120*b* in FIG. 2B illustrates supply current IDD during the turn on and turn off sequence with supply current shaping or smoothing. According to such embodiments, as shown in FIG. 2B, start phase 124 includes IDD shaping start phase 130 and block start phase 132. In such embodiments, before functional block 108, functional block 110, and functional block 112 are turned on, dummy load 104 is turned on to smoothly increase supply current IDD during IDD shaping start phase 130. After IDD shaping start phase 130, block start phase 132 includes turning on each of functional block 108, functional block 110, and functional block 112. As functional block 108, functional block 110, and functional block 112 are turned on during block start phase 132, dummy load 104 is decreased accordingly in order to maintain supply current IDD at constant current supply Idd_const.

According to various embodiments, after active phase 126, stop phase 134 includes turning dummy load 104 on again simultaneously with turning off functional block 108, functional block 110, and functional block 112. During stop phase 134, dummy load 104 is turned off slowly to smoothly decrease supply current IDD. Thus, according to various embodiments, dummy load 104 is controlled during a turn on and turn off sequence in order to shape or smooth supply current IDD.

In various embodiments, shaping or smoothing of transitions in supply current IDD may reduce or remove frequency components, or harmonics thereof, of the thermal crosstalk within a packaged device, such as device 100, that fall within sensitive frequency bands of one or more of the functional components, such as functional block 108, functional block 110, and functional block 112. In such embodiments, one of functional block 108, functional block 110, and functional block 112 may have a sensitive frequency band. For example, one of functional block 108, functional block 110, and functional block 112 may be a sensor, such as a MEMS sensor, that is sensitive to signals falling within the sensitive frequency band. In a particular embodiment, one of functional block 108, functional block 110, and functional block 112 is a microphone that has a sensitive frequency band from about 10 Hz to about 22 kHz. In such embodiments where one of functional block 108, functional block 110, and functional block 112 is a sensor, changes in supply current IDD as the various other functional components of device 100 turn on or turn off may generate thermal crosstalk with a frequency component, or a harmonic thereof, that falls within the sensitive frequency band of the sensor. Thus, the thermal crosstalk will contribute to noise or errors in the sensor operation. According to various embodiments, by shaping or smoothing transitions in supply current IDD, as shown by plot 120*b* in FIG. 2B, the frequency component, or the harmonics thereof, of the thermal crosstalk may be reduced or removed in the sensitive frequency band of the sensor.

Figure 3:
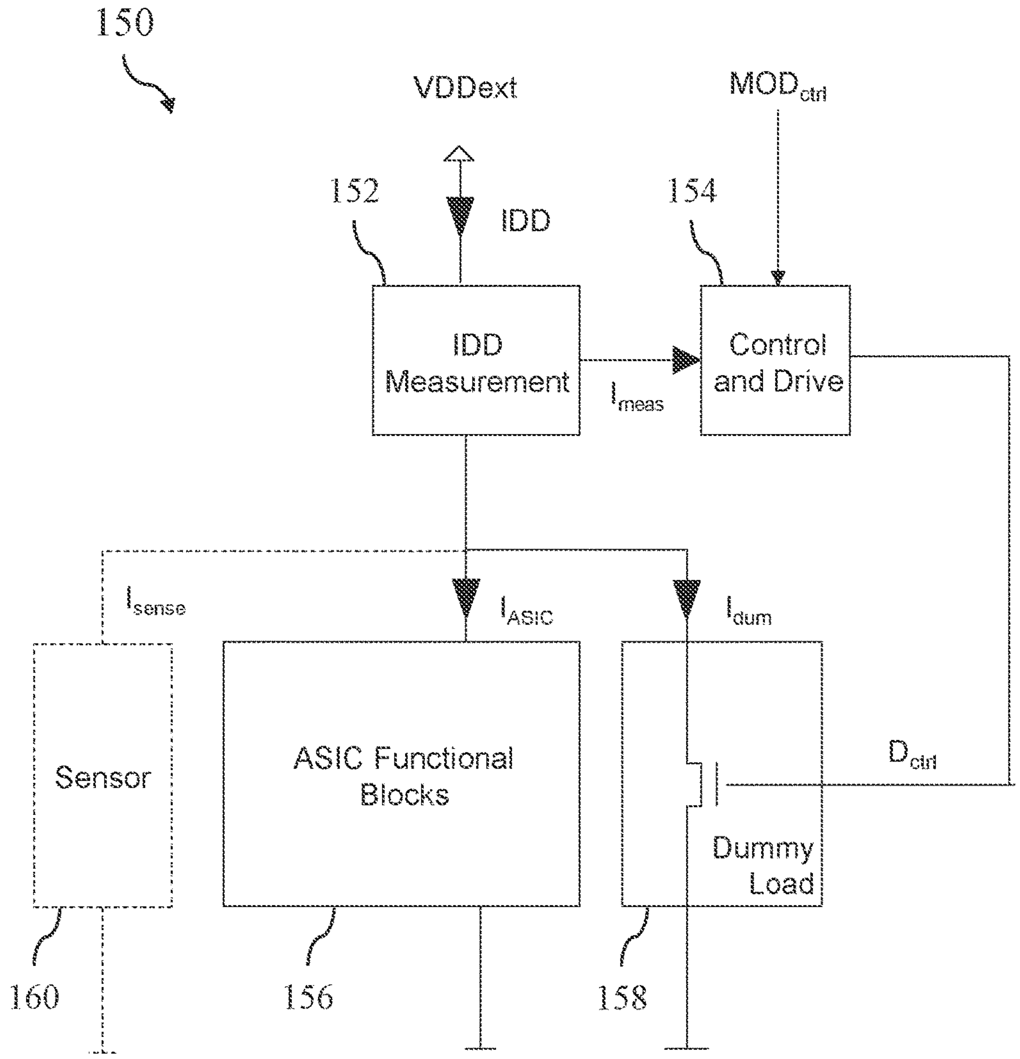
FIG. 3 illustrates a schematic diagram of an embodiment power supply shaping system.

FIG. 3 illustrates a schematic diagram of an embodiment power supply shaping system 150 including IDD measurement circuit 152, control and drive circuit 154, ASIC functional blocks 156, and dummy load 158. According to various embodiments, control and drive circuit 154 receives IDD measurement Imeas from IDD measurement circuit 152 and generates drive signal Dctrl for dummy load 158. In such embodiments, supply current IDD, which is provided from external supply VDDext, is split between ASIC current IASIC, which flows through and supplies ASIC functional blocks 156, and dummy current Idum, which flows through dummy load 158. According to some embodiments, sensor 160 may also be supplied by supply current IDD, which is then also split to sensor current Isense. In some such embodiment, sensor 160 may be a sensor that is always on, or substantially active, during normal operation of a packaged device, such as device 100.

According to various embodiments, ASIC functional blocks 156 includes multiple functional blocks, such as described hereinabove in reference to functional block 108, functional block 110, and functional block 112 in FIG. 1. As the various functional blocks of ASIC functional blocks 156 turn on and turn off, ASIC current IASIC, which is the supply current drawn by ASIC functional blocks 156, increases or decreases. As described hereinabove, the variation of current supply may lead to thermal crosstalk. For example, in some embodiments, sensor 160 may operate as the various functional blocks of ASIC functional blocks 156 turn on and turn off. The current supply variations caused by ASIC functional blocks 156 may produce thermal crosstalk that disturbs the operation of sensor 160. According to various embodiments, dummy load 158 is controlled by drive signal Dctrl in order to smooth or shape changes in supply current IDD.

According to various embodiments, control and drive circuit 154 determines changes in ASIC current IASIC and generates drive signal Dctrl to smooth or shape the corresponding changes in supply current IDD. In some embodiments, determining changes in ASIC current IASIC includes receiving mode control signal MODctrl, which indicates which of the various functional blocks of ASIC functional blocks 156 will turn on or turn off. For example, mode control signal MODctrl may include timing information for the activation and deactivation of various blocks of ASIC functional blocks 156 in some embodiments. Based on mode control signal MODctrl, control and drive circuit 154 generates drive signal Dctrl in order to smoothly adjust dummy current Idum before ASIC current IASIC undergoes a similar change. In further embodiments, determining changes in ASIC current IASIC includes receiving IDD measurement Imeas and generating drive signal Dctrl based on IDD measurement Imeas. In various embodiments, control and drive circuit 154 may generate drive signal Dctrl based on IDD measurement Imeas, mode control signal MODctrl, or both. In some embodiments, mode control MODctrl may be provided from ASIC functional blocks 156 or from a system controller (not shown).

According to various embodiments, control and drive circuit 154 generates drive signal based on IDD measurement Imeas or mode control signal MODctrl according to a target ramp value or shape. In various embodiments, control and drive circuit 154 may be implemented as an analog control circuit or a digital control circuit. Further, control and drive circuit 154 may be implemented on a same IC die as ASIC functional blocks 156 or on a separate IC die in different embodiments.

Figure 4:
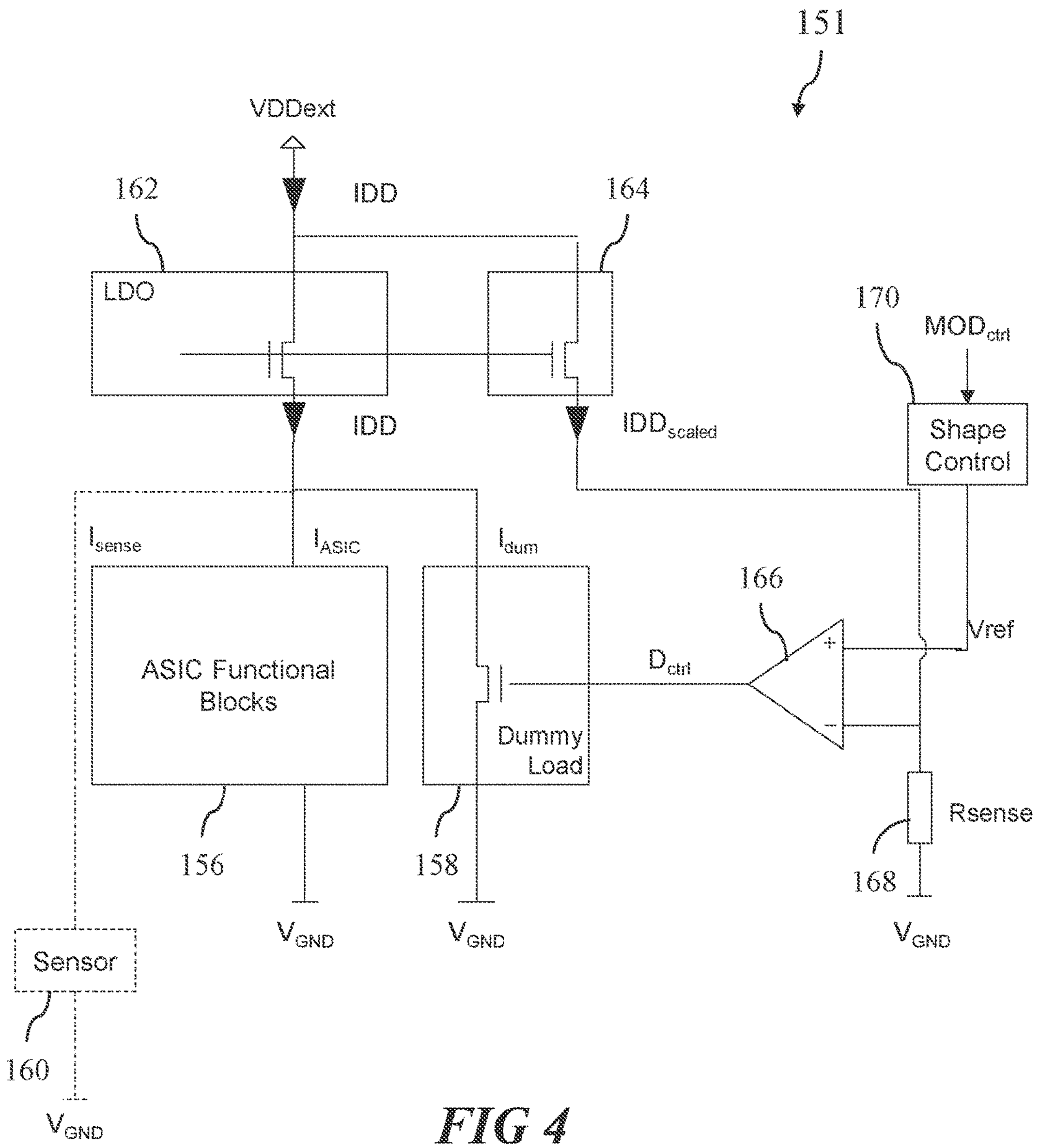
FIG. 4 illustrates a schematic diagram of another embodiment power supply shaping system.

FIG. 4 illustrates a schematic diagram of another embodiment power supply shaping system 151 including low-dropout (LDO) regulator 162, current copy transistor 164, ASIC functional blocks 156, dummy load 158, differential amplifier 166, sense resistor 168, shape control 170, and, optionally, sensor 160. According to various embodiments, power supply shaping system 151 is one embodiment implementation of power supply shaping system 150 as described hereinabove in reference to FIG. 3. In such embodiments, LDO regulator 162 supplies ASIC functional blocks 156, and optionally sensor 160, with supply current IDD from external supply VDDext while current copy transistor 164 generates scaled supply current IDDscaled, which is a scaled copy of supply current IDD. For example, scaled supply current IDDscaled may be 1/10, 1/100, or 1/1000 of supply current IDD. In such embodiments, the value of supply current IDD after LDO regulator 162 is reduced from the value of supply current IDD before LDO regulator 162 and current copy transistor 164 by the amount of scaled supply current IDDscaled, but, for the sake of simplicity of illustration and discussion, supply current IDD is approximated as unchanged.

According to various embodiments, differential amplifier 166 receives a voltage based on scaled supply current IDDscaled flowing through sense resistor 168 at the inverting input and reference voltage Vref at the non-inverting input. In such embodiments, dummy load 158 is controlled by the output of differential amplifier 166, which is based on scaled supply current IDDscaled, in order to increase or decrease inversely compared to changes in scaled supply current IDDscaled, which is based on supply current IDD.

According to various embodiments, the shaping or smoothing of changes in supply current IDD is provided by reference voltage Vref. As the various functional blocks of ASIC functional blocks 156 turn on or turn off, shape control 170 adjusts reference voltage Vref to smooth or shape the changes in supply current IDD. In such embodiments, shape control 170 may include a digital or analog circuit for generating reference voltage Vref that corresponds to a target ramp value or ramp shape for changes in supply current IDD. In various embodiments, shape control 170 receives mode control signal MODctrl as described hereinabove in reference to FIG. 3.

According to various embodiments, sense resistance Rsense of sense resistor 168 and scaling factor k of current copy transistor 164, which is the scaling factor between supply current IDD and scaled supply current IDDscaled, are selected based on the various system requirements. In such embodiments, scaled supply current IDDscaled is given by the equation $$IDD_{scaled} = \frac{k}{1+k} IDD.$$

Based on this equation and sense resistance Rsense, the voltage, V−, at the inverting node of differential amplifier 166 is given by the equation $$V- = R_{sense} \frac{k}{1+k} IDD - V_{GND},$$

where reference voltage VGND is the ground reference for sense resistor 168. In such embodiments, reference voltage Vref is provided by shape control 170 in order to shape or smooth supply current IDD changes, through increasing or decreasing dummy current Idum, because drive signal Dctrl provided at the output of differential amplifier 166 is based on the difference between reference voltage Vref and the voltage, V−, at the inverting input.

According to various embodiments, shaping or smoothing changes in supply current IDD includes providing the changes as a linear ramp. In various other embodiments, shaping or smoothing changes in supply current IDD includes providing the changes with a smooth curve between transitions according to an S-shape transition, as illustrated in plot 120*b* in FIG. 2B. In alternative embodiments, shaping or smoothing changes in supply current IDD includes providing the changes with another shape. For example, in some embodiments, changes in supply current IDD may be shaped with successive smaller steps that form a stair step function. In such embodiments, the stair step function may be implemented using a DAC in shape control 170 to drive reference voltage Vref.

In various embodiments, each of the components of power supply shaping system 151 may be integrated on a single IC die. In other embodiments, the various components may be integrated on different microfabricated dies. For example, sensor 160 may be formed on a first microfabricated die and ASIC functional blocks 156 may be formed on one or more additional microfabricated dies.

Figure 5:
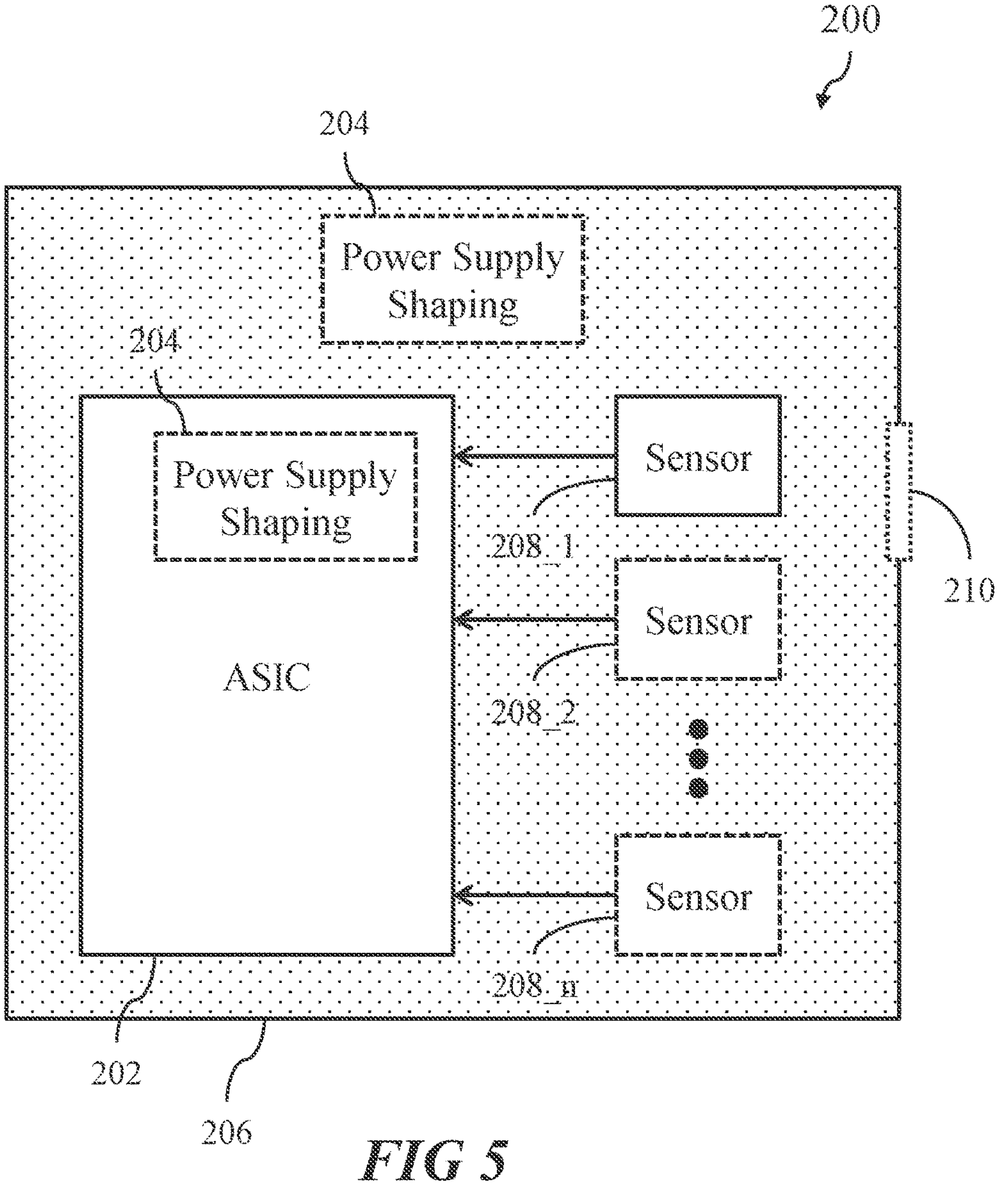
FIG. 5 illustrates a system schematic of an embodiment packaged device.

FIG. 5 illustrates a system schematic of an embodiment packaged device 200 including ASIC 202, power supply shaping circuit 204, sensors 208_1, 208_2, . . . , **208_*n*, package 206, and environmental port 210. According to various embodiments, packaged device 200 illustrates a package arrangement for any of the embodiments described hereinabove in reference to the other figures, such as in reference to device 100 in FIG. 1, power supply shaping system 150 in FIG. 3, or power supply shaping system 151 in FIG. 4, for example. Thus, in various embodiments, ASIC 202 may include any of controller 102, functional block 108, functional block 110, functional block 112, or ASIC functional blocks 156. In various embodiments, power supply shaping circuit 204 may include the various components of power supply shaping system 150 or power supply shaping system 151, excluding ASIC functional blocks 156, sensor 160, and LDO regulator 162, for example. In such embodiments, power supply shaping circuit 204 may be included in ASIC 202, such as on a single microfabricated IC die, or may be included separate from ASIC 202**, such as on an additional separate microfabricated IC die.

According to various embodiments, package 206 may include a PCB, to which ASIC 202, power supply shaping circuit 204, or sensors 208_1, 208_2, . . . , **208_*n* are attached. In some embodiments, package 206 is a wafer stack, where ASIC 202, power supply shaping circuit 204, or sensors 208_1, 208_2, . . . , 208_*n* are wafer bonded, for example. In various embodiments, package 206 includes an outer casing that protects the functional components of packaged device 200. For example, in some embodiments, package 206 includes a metal, plastic, or composite case protecting the components of packaged device 200**.

In various embodiments, environmental port 210 is formed in package 206 in order to provide environmental communication between an ambient environment surrounding packaged device 200 and sensors 208_1, 208_2, . . . , **208_*n*. For example, the ambient environment is in fluid communication with sensors 208_1, 208_2, . . . , 208_*n* through environmental port 210** in some embodiments.

According to various embodiments, sensors 208_1, 208_2, . . . , **208_*n* may include any number n of sensors. In some embodiments, only a single sensor is included. In other particular embodiments, between 2 and 10 sensors are included, such as 3 or 4 sensors. According to various embodiments, sensors 208_1, 208_2, . . . , 208_*n* may include sensors from the group including temperature sensors, microphones, pressure sensors, humidity sensors, gas sensors, particulate matter sensors, accelerometers, and gyroscopes. In various such embodiments, sensors 208_1, 208_2, . . . , 208_*n*** may be MEMS sensors.

Figure 6:
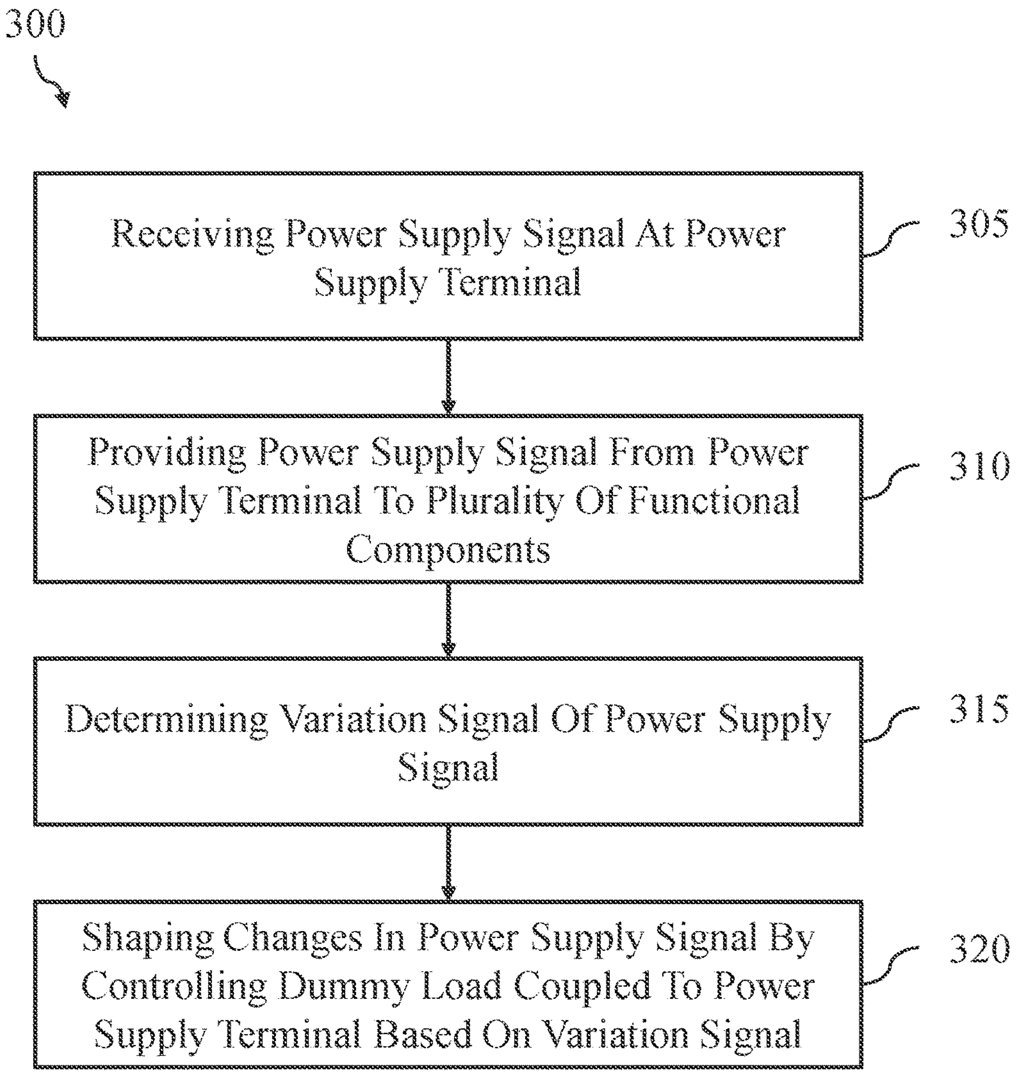
FIG. 6 illustrates a block diagram of an embodiment method of operation.

FIG. 6 illustrates a block diagram of an embodiment method of operation 300 including steps 305, 310, 315, and 320. According to various embodiments, step 305 includes receiving a power supply signal at a power supply terminal. Step 310 includes providing the power supply signal from the power supply terminal to a plurality of functional components. For example, the plurality of functional components may include sensors as described hereinabove in reference to sensors 208_1, 208_2, . . . , **208_*n* in FIG. 5 or functional circuit blocks as described hereinabove in reference to functional block 108, functional block 110, and functional block 112 in FIG. 1**.

According to various embodiments, step 315 includes determining a variation signal of the power supply signal. In some embodiments, the variation signal is the result of turning on and turning off various functional blocks of the functional components within a packaged device. In various embodiments, determining the variation signal of the power supply signal includes measuring the current supply or receiving a control signal indicative of the turning on and turning off of the various functional blocks within the packaged device. Following step 315, step 320 includes shaping changes in the power supply signal by controlling a dummy load coupled to the power supply terminal based on the variation signal determined in step 315. In various such embodiments, changes in the power supply signal are shaped or smoothed to, for example, reduce the effects of thermal crosstalk between the various functional components.

In various embodiments, method of operation 300 may include additional steps or modification and rearrangement of steps.

According to an embodiment, a device includes a power supply terminal configured to provide a power supply signal to a plurality of functional components and a power supply shaping circuit coupled to the power supply terminal. The power supply shaping circuit is configured to determine a variation signal of the power supply signal and shape changes in the power supply signal by controlling a dummy load coupled to the power supply terminal based on the variation signal.

According to various embodiments, determining a variation signal of the power supply signal includes receiving control information from a system controller. In such embodiments, the control information may include timing information for activation and deactivation of the plurality of functional components based on a plurality of operation modes of the device. In additional embodiments, the control information includes a change of activity on an external interface between the system controller and the plurality of functional components. The change of activity on the external interface includes a change of clock rate on the external interface in some embodiments.

According to various embodiments, the device further includes the plurality of functional components. In some embodiments, the plurality of functional components includes a plurality of functional circuit blocks integrated together on a single integrated circuit die and a sensor. In such embodiments, the sensor includes a microphone. In some embodiments, determining a variation signal of the power supply signal includes measuring the power supply signal.

According to various embodiments, the power supply shaping circuit includes a dummy transistor operating as the dummy load, a differential amplifier having an inverting input terminal configured to receive a measurement signal based on the power supply signal and a non-inverting terminal configured to receive a reference signal, and a controller configured to generate the reference signal based on a target shape for the power supply signal. In some embodiments, shaping the power supply signal includes adjusting the shape of the power supply signal in order to reduce frequency components in a first frequency band. In some particular embodiments, the first frequency band includes only frequencies below 22 kHz.

According to an embodiment, a method of operating a device includes receiving a power supply signal at a power supply terminal, providing the power supply signal from the power supply terminal to a plurality of functional components, determining a variation signal of the power supply signal, and shaping changes in the power supply signal by controlling a dummy load coupled to the power supply terminal based on the variation signal.

According to various embodiments, determining a variation signal of the power supply signal includes receiving control information from a system controller. In such embodiments, the control information may include timing information for activation and deactivation of the plurality of functional components based on a plurality of operation modes of the device. In further embodiments, the control information includes a change of activity on an external interface between the system controller and the plurality of functional components. In such embodiments, the change of activity on the external interface includes a change of clock rate on the external interface.

According to various embodiments, determining a variation signal of the power supply signal includes measuring the power supply signal. In some embodiments, shaping the power supply signal includes generating a reference signal based on a target shape for the power supply signal, generating a control signal at a differential amplifier, and controlling a dummy transistor as the dummy load based on the control signal. In such embodiments, the control signal is based on an inverting input of the differential amplifier configured to receive a measurement signal based on the power supply signal and a non-inverting input of the differential amplifier configured to receive the reference signal.

According to various embodiments, shaping the power supply signal includes adjusting the shape of the power supply signal in order to reduce frequency components in a first frequency band. In some particular embodiments, the first frequency band includes only frequencies below 22 kHz. In additional embodiments, providing the power supply signal from the power supply terminal to a plurality of functional components includes providing the power supply signal from the power supply terminal to a plurality of functional circuit blocks integrated on an integrated circuit die and a sensor. In such embodiments, the sensor may include a microphone.

According to an embodiment, a packaged device includes a first functional component coupled to a supply line, a second functional component coupled to the supply line, a dummy load coupled to the supply line, a measurement circuit coupled to the supply line, and a control circuit coupled to the measurement circuit and the dummy load. The measurement circuit is configured to measure a supply variation on the supply line and generate a measurement signal based on the supply variation. The control circuit is configured to receive the measurement signal and control the dummy load based on the measurement signal in order to shape the supply variation.

According to various embodiments, the packaged device further includes a first microelectromechanical systems (MEMS) sensor. In such embodiments, the first MEMS sensor may include a bandpass frequency response that is sensitive to frequencies greater than 10 Hz and less than 22 kHz. In additional embodiments, the packaged device further includes a second MEMS sensor, where the first MEMS sensor and the second MEMS sensor are respectively configured to sense two different physical signals from a list of physical signals including sound, pressure, temperature, and gas concentration. In further embodiments, the first functional component and the second functional component are integrated together on a single integrated circuit die. In some embodiments, the control circuit is configured to control the dummy load also based on control information from a system controller, where the control information includes timing information for activation and deactivation of the first functional component and the second functional component.

According to an embodiment, a packaged device includes a first functional component, a second functional component, a first control circuit coupled to the first functional component and the second functional component, a dummy load, and a second control circuit coupled to the first functional component, the second functional component, the first control circuit, and the dummy load. The first control circuit is configured to activate and deactivate the first functional component and the second functional component. The second control circuit is configured to control the dummy load based on control information, where the dummy load is controlled to shape power supply variations corresponding to the control information.

According to various embodiments, the control information includes timing information for activation and deactivation of the first functional component and the second functional component based on a plurality of operation modes of the packaged device. In some embodiments, the control information includes a change of activity on an external interface between a system controller and the first functional component and the second functional component.

According to various embodiments, packaged device further includes a frequency sensitive sensor having a first sensitive frequency range, where the first functional component and the second functional component generate thermal variations during activation or deactivation that have frequency components within the first sensitive frequency range. In some embodiments, the dummy load is controlled to shape power supply variations in order to reduce the frequency components within the first sensitive frequency range.

According to various embodiments described herein, advantages may include packaged devices including multiple functional components with reduced impact from thermal crosstalk between the various functional components. In particular embodiments, advantages may include reduced frequency components, or harmonics, of thermal crosstalk in frequency bands of sensitivity for various functional components. Thus, some embodiments may advantageously include smoothed or shaped power supply changes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
- a power supply terminal configured to provide a power supply signal to a plurality of functional components; and
- a power supply shaping circuit coupled to the power supply terminal and configured to:
  - determine a variation signal of the power supply signal, and
  - shape changes in the power supply signal by controlling a dummy load coupled to the power supply terminal based on the variation signal.

2. The device of claim 1, wherein determining a variation signal of the power supply signal comprises receiving control information from a system controller.

3. The device of claim 2, wherein the control information comprises timing information for activation and deactivation of the plurality of functional components based on a plurality of operation modes of the device.

4. The device of claim 2, wherein the control information comprises a change of activity on an external interface between the system controller and the plurality of functional components.

5. The device of claim 4, wherein the change of activity on the external interface comprises a change of clock rate on the external interface.

6. The device of claim 1, further comprising the plurality of functional components.

7. The device of claim 6, wherein the plurality of functional components comprise:
- a plurality of functional circuit blocks integrated together on a single integrated circuit die; and
- a sensor.

8. The device of claim 7, wherein the sensor comprises a microphone.

9. The device of claim 1, wherein determining a variation signal of the power supply signal comprises measuring the power supply signal.

10. The device of claim 1, wherein the power supply shaping circuit comprises:
- a dummy transistor operating as the dummy load;
- a differential amplifier having an inverting input terminal configured to receive a measurement signal based on the power supply signal and a non-inverting terminal configured to receive a reference signal; and a controller configured to generate the reference signal based on a target shape for the power supply signal.

11. The device of claim 1, wherein shaping the power supply signal comprises adjusting the shape of the power supply signal in order to reduce frequency components in a first frequency band.

12. The device of claim 11, wherein the first frequency band consists of frequencies below 22 kHz.

13. A method of operating a device, the method comprising:

receiving a power supply signal at a power supply terminal;

providing the power supply signal from the power supply terminal to a plurality of functional components;

determining a variation signal of the power supply signal; and shaping changes in the power supply signal by controlling a dummy load coupled to the power supply terminal based on the variation signal.

14. The method of claim 13, wherein determining a variation signal of the power supply signal comprises receiving control information from a system controller.

15. The method of claim 14, wherein the control information comprises timing information for activation and deactivation of the plurality of functional components based on a plurality of operation modes of the device.

16. The method of claim 14, wherein the control information comprises a change of activity on an external interface between the system controller and the plurality of functional components.

17. The method of claim 16, wherein the change of activity on the external interface comprises a change of clock rate on the external interface.

18. The method of claim 13, wherein determining a variation signal of the power supply signal comprises measuring the power supply signal.

19. The method of claim 13, wherein shaping the power supply signal comprises:

generating a reference signal based on a target shape for the power supply signal;

generating a control signal at a differential amplifier, the control signal based on an inverting input of the differential amplifier configured to receive a measurement signal based on the power supply signal and a non-inverting input of the differential amplifier configured to receive the reference signal; and controlling a dummy transistor as the dummy load based on the control signal.

20. The method of claim 13, wherein shaping the power supply signal comprises adjusting the shape of the power supply signal in order to reduce frequency components in a first frequency band.

21. The method of claim 20, wherein the first frequency band consists of frequencies below 22 kHz.

22. The method of claim 13, wherein providing the power supply signal from the power supply terminal to a plurality of functional components comprises providing the power supply signal from the power supply terminal to a plurality of functional circuit blocks integrated on an integrated circuit die and a sensor.

23. The method of claim 22, wherein the sensor comprises a microphone.

24. A packaged device comprising:

a first functional component coupled to a supply line;

a second functional component coupled to the supply line;

a dummy load coupled to the supply line;

a measurement circuit coupled to the supply line and configured to:

measure a supply variation on the supply line, and generate a measurement signal based on the supply variation; and a control circuit coupled to the measurement circuit and the dummy load, the control circuit configured to:

receive the measurement signal, and control the dummy load based on the measurement signal in order to shape the supply variation.

25. The packaged device of claim 24, further comprising a first microelectromechanical systems (MEMS) sensor.

26. The packaged device of claim 25, wherein the first MEMS sensor comprises a bandpass frequency response that is sensitive to frequencies greater than 10 Hz and less than 22 kHz.

27. The packaged device of claim 25, further comprising a second MEMS sensor, wherein the first MEMS sensor and the second MEMS sensor are respectively configured to sense two different physical signals from a list of physical signals including sound, pressure, temperature, and gas concentration.

28. The packaged device of claim 25, wherein the first functional component and the second functional component are integrated together on a single integrated circuit die.

29. The packaged device of claim 24, wherein the control circuit is configured to control the dummy load also based on control information from a system controller, the control information comprising timing information for activation and deactivation of the first functional component and the second functional component.

30. A packaged device comprising:

a first functional component;

a second functional component;

a first control circuit coupled to the first functional component and the second functional component, the first control circuit configured to activate and deactivate the first functional component and the second functional component;

a dummy load; and a second control circuit coupled to the first functional component, the second functional component, the first control circuit, and the dummy load, the second control circuit configured to control the dummy load based on control information, wherein the dummy load is controlled to shape power supply variations corresponding to the control information.

31. The packaged device of claim 30, wherein the control information comprises timing information for activation and deactivation of the first functional component and the second functional component based on a plurality of operation modes of the packaged device.

32. The packaged device of claim 30, wherein the control information comprises a change of activity on an external interface between a system controller and the first functional component and the second functional component.

33. The packaged device of claim 30, further comprising a frequency sensitive sensor having a first sensitive frequency range, wherein the first functional component and the second functional component generate thermal variations during activation or deactivation that have frequency components within the first sensitive frequency range.

34. The packaged device of claim 33, wherein the dummy load is controlled to shape power supply variations in order to reduce the frequency components within the first sensitive frequency range.

* * * * *